Oct. 27, 1931.　　　H. C. HARRIS　　　1,829,720
PIVOTAL CONNECTION
Filed April 6, 1927　　　2 Sheets-Sheet 1

Inventor
Howard C. Harris
Kwis Hudson & Kent
Attorneys

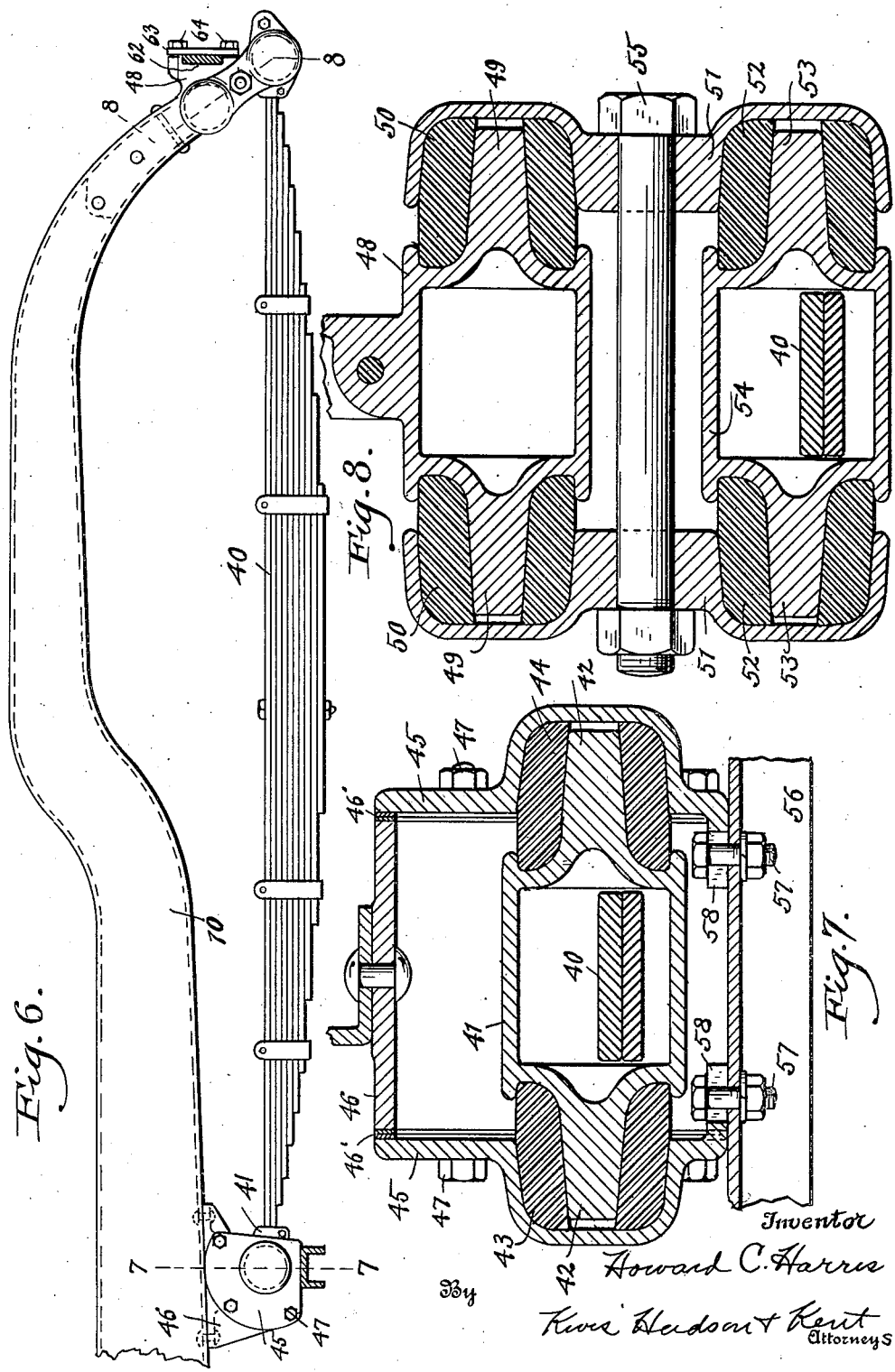

Patented Oct. 27, 1931

1,829,720

UNITED STATES PATENT OFFICE

HOWARD C. HARRIS, OF AKRON, OHIO

PIVOTAL CONNECTION

Application filed April 6, 1927. Serial No. 181,349.

This invention relates to vehicles and more particularly to connections between the vehicle frame and the ends of the springs which support it.

It is one of the objects of the invention to provide an improved type of connection that will accommodate the spring movements and avoid the use of the ordinary pivotal connections which require lubrication and are subject to excessive wear and are otherwise objectionable because of their tendency to squeak and rattle.

A further object of the invention is to provide an improved form of connection in which relative movements between the spring and frame are accommodated by the torsional flexing of rubber bushings, thereby eliminating the use of contacting relatively movable parts requiring lubrication.

A further object of the invention is to provide an improved type of connection that will embody rubber bushings which will act as cushioning means to prevent the transmission of shocks from the spring to the frame.

A further object of the invention is to provide an improved type of connection, embodying rubber bushings, that will be capable of manufacture at a relatively low cost, that will be easy to assemble and efficient in operation.

A further object of the invention is to provide an improved form of connection that will permit the use of springs having eyes at their ends and yet avoid the disadvantage of previous connections wherein the entire load was transmitted through these eyes to the frame.

Other objects of the invention and the features of novelty will be apparent from the following description, taken in connection with the accompanying drawings, of which:

Fig. 6 is a side elevation of a rear spring and a portion of an automobile frame, with connections therebetween embodying my invention;

Fig. 7 is an enlarged section on the line 7—7 of Fig. 6; and

Fig. 8 is an enlarged section on the line 8—8 of Fig. 6.

Figure 1:
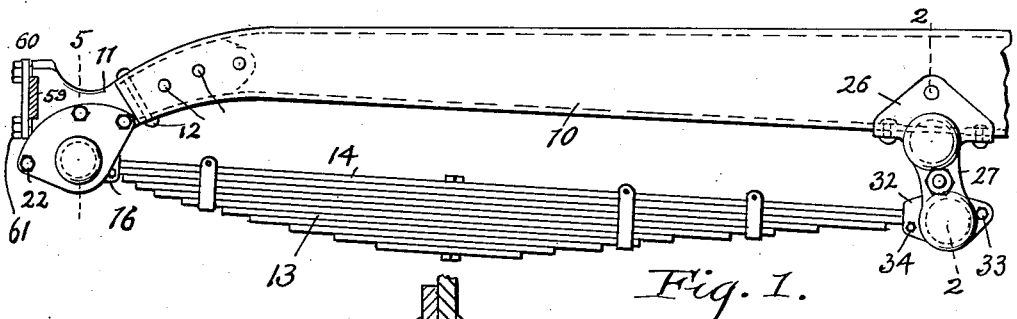
Fig. 1 is a side elevation of a front spring and a portion of an automobile frame, with connections therebetween embodying my invention.

Referring to the drawings, 10 indicates one of the side members of an automobile frame and, in Fig. 1, the front end thereof, to which there is attached a horn or bracket 11, by means of rivets or bolts 12. A multiple-leaf spring is shown at 13 and the main leaf thereof, 14, is provided with eyes, such as 15, at its opposite ends. A hollow box-like member 16 is arranged on the end of the spring 13 and a bolt 17 passes through ears and the spring eye for the purpose of securing the member 16 against movement longitudinally of the spring. The member 16 has an end wall 18 which rests on the upper side of the main leaf 14, and a bolt 19, carried by the member 16, passes beneath the end of the second leaf of the spring and cooperates with the end wall 18 to prevent the member 16 from oscillating relative to the spring.

Each of the members 16 has a pair of aligned trunnions 20 projecting from opposite sides thereof and these trunnions are preferably made hexagonal or of other non-circular cross-section. It is also preferred that the trunnions 20 shall be of tapering form, but this is not necessary.

Side plates 21 are secured on opposite sides of the bracket or horn 11 by means of bolts 22 and each of these side plates is formed with a socket 23 to receive a rubber bushing 24 that is mounted upon one of the trunnions 20. Shims 25 are provided between the side plates 21 and the bracket 11 to permit lateral adjustment of the side plates for the purpose of compressing the rubber bushings 24 in the axial direction and to permit whatever subsequent adjustment of the side plates may be necessary to compensate for any slight deformation in the bushings 24 that results from service.

The construction just described provides a pivotal connection between the front end of the spring and the bracket 11 to accommodate relative movements between the spring and the frame, the oscillations of the member 16, due to these relative movements, being accommodated by torsional flexing of the bushings 24, it being understood that these bushings, in their normal functioning, do not slip on the trunnions 20 or within the sockets 23. At the same time, the end of the spring is cushioned so that road shocks will be dissipated in the rubber bushings 24 and not transmitted to the frame of the vehicle. It should also be noted that the axis of the trunnions 20 is spaced longitudinally of the spring from the adjacent eye and that the load, transmitted through the bracket 11, is distributed to the spring through the bolt 17 and the wall 18 of the member 16.

Figure 2:
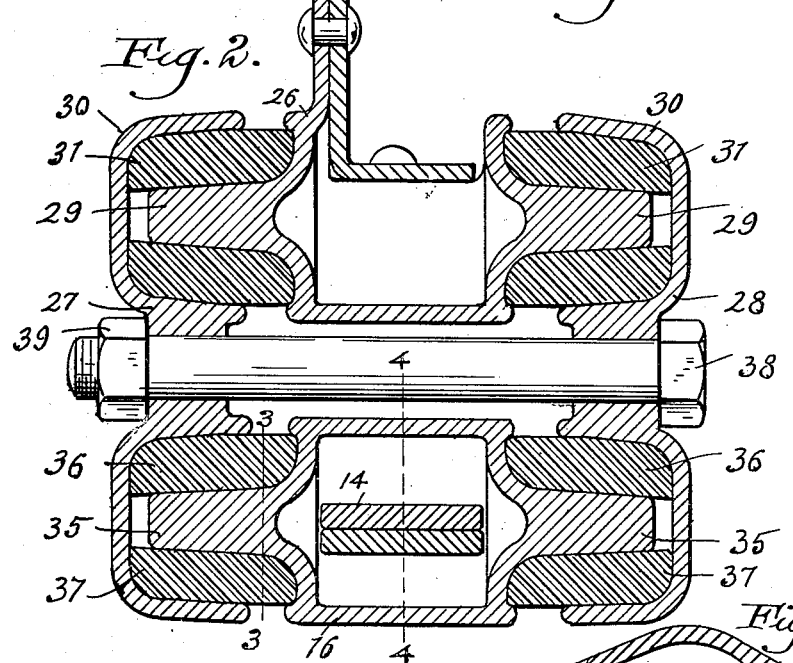
Fig. 2 is an enlarged section on the line 2—2 of Fig. 1.
Figures 3, 4, 5:
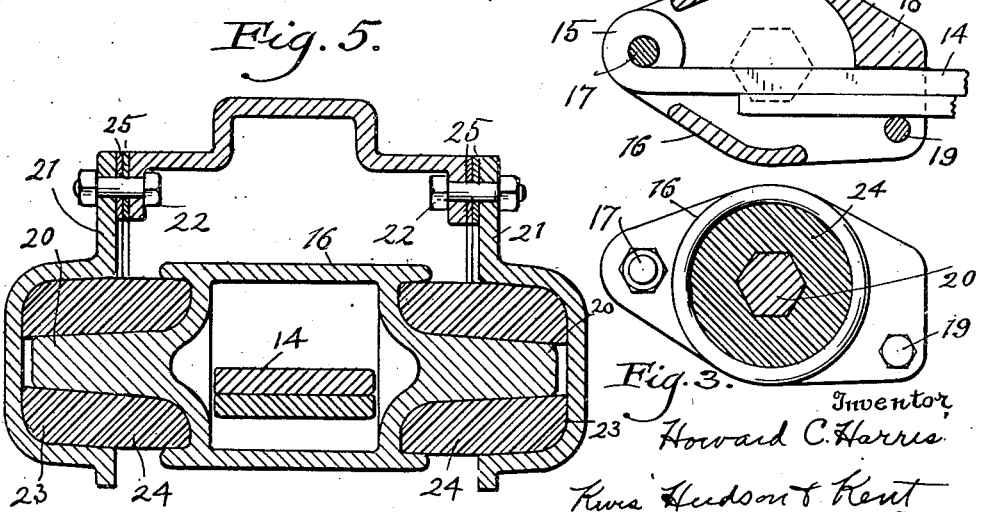
Fig. 3 is a section on the line 3—3 of Fig. 2.
Fig. 4 is a section on the line 4—4 of Fig. 2.
Fig. 5 is an enlarged section on the line 5—5 of Fig. 1.

Referring to Figs. 1 and 2, it will be seen that the rear end of the spring 13 is connected with the frame 10 by means of a bracket 26 and a pair of shackle members 27 and 28. The bracket 26 has a pair of aligned trunnions 29, similar to the trunnions 20, previously described, and rubber bushings 30 are mounted on these trunnions and engage with sockets 31 in the shackle members 27 and 28. A hollow box-like member 32, similar to the member 16, is arranged on the end of the spring and a bolt 33 passes through ears on this member and the rear spring eye. The member 32 is an end wall similar to the wall 18 of the member 16 which engages the upper side of the spring and there is a bolt 34 which passes beneath the springs and cooperates with said wall to hold the member 32 against oscillation on the spring. The member 32 has a pair of aligned trunnions 35, similar to the trunnions 20, and rubber bushings 36 are arranged on these trunnions and are seated in the sockets 37 in the shackle members 27 and 28. For the purpose of compressing the bushings 30 and 36 and laterally adjusting the shackle members 27 and 28, there is a bolt 38 which connects the middle portion of the shackle members as shown in Fig. 2, the nut 39 providing the necessary adjusting means.

Referring to Figs. 6 to 8, it will be seen that the forward end of the rear spring 40 has mounted thereon a member 41, similar to the member 16 and secured to the spring in the manner previously described, it being understood that the main leaf of the spring 40 is provided with the usual eyes at its opposite ends. The member 41 has a pair of laterally projecting trunnions 42 on which there are rubber bushings 43, similar to the bushings 24, and seated in sockets 44 in the side plates 45 of the bracket 46, lateral adjustment of these side plates being provided by means of the shims 46' and the side plates being secured in position by bolts 47.

The rear end of the frame 10 is provided with a horn or bracket 48 having laterally projecting trunnions 49 on which the rubber bushings 50 are mounted. Shackle members 51, similar to the shackle members 27 and 28, are provided with sockets for the rubber bushings 50 and also with sockets for rubber bushings 52 which are mounted on the trunnions 53 on the member 54, the latter being similar to the member 16 and secured to the end of the spring in the manner previously described. The shackle members 51 are secured together and adjusted by means of the bolt 55, which is similar to the bolt 38.

From the foregoing description, it will be seen that the connections between the springs and the frame are capable of accommodating all of the spring movements without use of any contacting relatively movable metal parts that would require lubrication. The bolts 38 and 55 are readily removable and permit the shackle connections to be readily disassembled or assembled. The detachable side plates 21 and 45 permit the connections at the forward ends of the springs to be readily disassembled and assembled.

Referring to Fig. 7, it will be noted that a channel bar 56 is secured to the side plates 45 by the bolts 57 which extend through slots in lugs 58 on the side plates, these slots permitting the side plates to be adjusted. The channel bar may extend outside of the vehicle frame and serve as a running board bracket, in addition to serving to tie the side plates 45 together below the spring connection.

When so desired, the bracket 11 may also serve as a mounting for a bumper and I have illustrated, at 59, the rear bar of a bumper, the same being secured to the bracket 11 by means of a clamping plate 60 and bolts 61. In a somewhat similar manner, the bracket 48 may serve as a support for a bumper and, in Fig. 6, I have shown one of the bars of a bumper at 62, the same being secured to the bracket 48 by the clamping plate 63 and bolts 64.

Having thus described my invention, what I claim is:

1. In vehicles, the combination of a frame, a bracket on said frame, a multiple-leaf spring having an eye at one end, a member on said spring and secured against movement relative thereto by means includng a bolt passing through said eye, and means connecting said member with said bracket, having a pivotal connection with said member, the axis of which is located inwardly along said spring from said eye.

2. In vehicles, the combination of a frame, a bracket on said frame, a member pivotally connected with said bracket and oscillatable relative thereto, a multiple-leaf spring having an eye at one end, a bolt passing through said eye and said member and whereby said member is held against movement longitudinally of the spring, said bolt being located to one side of the axis of the pivotal connection between said member and said bracket and being substantially fixed thereby against movement longitudinally of the vehicle, and means connecting the other end of said spring with said frame.

3. In vehicles, the combination of a frame, a bracket on said frame, a member pivotally connected with said bracket and oscillatable relative thereto, a multiple-leaf spring having an eye at one end, a bolt passing through said eye and said member and whereby said member is held against movement longitudinally of the spring, said bolt being located to one side of the axis of the pivotal connection between said member and said bracket and being substantially fixed thereby against movement longitudinally of the vehicle, means preventing said member from oscillating relative to said eye, and means for connecting the other end of said spring with said frame.

4. In vehicles, the combination of a frame, a multiple-leaf spring having eyes at its ends, members mounted on the ends of said spring, a shackle pivotally connected to one of said members and to said frame, a bracket on said frame to which the other of said members is pivotally connected, and the axes of said pivotal connections between said members and said shackle and said bracket being located intermediate the axes of said eyes.

5. In vehicles, the combination of a frame, a multiple-leaf spring having an eye at one end, a member secured to said end of said spring and held against movement relative thereto by means comprising a bolt passing through said eye, means through which the load is transmitted from said frame to said spring having an oscillatable connection with said member, the axis of which is spaced from said eye in the direction toward the opposite end of said spring, and means connecting said opposite end of the spring with said frame.

6. In vehicles, the combination of a frame, a multiple-leaf spring having an eye at one end, a member secured to said end of said spring by means including a bolt passing through said eye, said member having a pair of aligned trunnions projecting from opposite sides thereof, rubber bushings arranged on said trunnions, means for connecting said end of said spring with said frame having sockets for said bushings, and means for connecting the other end of said spring with said frame.

7. In vehicles, the combination of a frame, a multiple-leaf spring having an eye at one end, a member secured to said end of said spring by means including a bolt passing through said eye, said member having a pair of aligned trunnions projecting from opposite sides thereof, a pair of aligned trunnions fixed on said frame with their axes substantially parallel with the axes of the first-mentioned trunnions, rubber bushings on said trunnions, a pair of shackle members each of which has sockets for two of said bushings, means for drawing shackle members toward each other to compress said bushings axially, and means for connecting the opposite end of said spring with said frame.

8. In vehicles, the combination of a frame, a multiple-leaf spring having an eye at one end, a box-like member enclosing said end of said spring and having a pair of aligned trunnions projecting from opposite sides thereof, means including a bolt through said eye for securing said member to said spring, rubber bushings on said trunnions, and means having sockets for said bushings and whereby said spring is connected with said frame.

9. In vehicles, the combination of a frame, a multiple-leaf spring having an eye at one end, a box-like member enclosing said end of said spring and having a pair of aligned trunnions projecting from opposite sides thereof, means including a bolt through said eye for securing said member to said spring, rubber bushings on said trunnions, a bracket on said frame having adjustable socket members for said bushings, and a member adjustably connected with said socket members below said box-like member.

10. As a new article of manufacture, a multiple-leaf spring having eyes at its ends, and members mounted on the ends of the spring and each having a pair of aligned oppositely projecting trunnions, and means for rigidly securing said members to said spring comprising bolts passing through said eyes.

11. As a new article of manufacture, a multiple-leaf spring having eyes at its ends, and members mounted on the ends of the spring and each having a pair of aligned oppositely projecting trunnions, the distance between the axes of said trunnions being less than that between the axes of said eyes, and means for rigidly securing said members to said spring comprising bolts passing through said eyes.

In testimony whereof, I hereunto affix my signature.

HOWARD C. HARRIS.